(12) United States Patent
Yamada et al.

(10) Patent No.: US 9,871,478 B2
(45) Date of Patent: Jan. 16, 2018

(54) MOVING BODY SYSTEM AND METHOD FOR DRIVING MOVING BODY

(71) Applicant: Murata Machinery, Ltd., Kyoto-shi, Kyoto (JP)

(72) Inventors: Yasutake Yamada, Inuyama (JP); Yoshiyuki Azuma, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 14/785,779

(22) PCT Filed: Apr. 3, 2014

(86) PCT No.: PCT/JP2014/059843
§ 371 (c)(1),
(2) Date: Oct. 20, 2015

(87) PCT Pub. No.: WO2014/175032
PCT Pub. Date: Oct. 30, 2014

(65) Prior Publication Data
US 2016/0072419 A1  Mar. 10, 2016

(30) Foreign Application Priority Data
Apr. 22, 2013  (JP) .................................. 2013-089408

(51) Int. Cl.
*H02P 3/00*  (2006.01)
*H02P 8/00*  (2006.01)
(Continued)

(52) U.S. Cl.
CPC .............. *H02P 8/005* (2013.01); *B60L 13/03* (2013.01); *H02K 11/0094* (2013.01);
(Continued)

(58) Field of Classification Search
CPC .... H02K 41/03; H02K 11/0094; H02P 25/06; H02P 8/005
(Continued)

(56) References Cited

U.S. PATENT DOCUMENTS 5,130,583 A    7/1992  Andoh
8,653,766 B2 *  2/2014  Nomura .................. H02P 25/06
                                                310/112
(Continued)

FOREIGN PATENT DOCUMENTS

EP    1178589 A1    2/2002
JP    59-201605 A   11/1984
(Continued)

OTHER PUBLICATIONS

Japanese language International Search Report dated Jun. 10, 2014 and its English language translation issued in corresponding PCT application PCT/JP2014/059843 cites the foreign patent documents listed above.
(Continued)

Primary Examiner — Eduardo Colon Santana
Assistant Examiner — Gabriel Agared
(74) Attorney, Agent, or Firm — DLA Piper LLP (US)

(57) ABSTRACT

In order to prevent the length of the movement path from being limited to the pitch of a magnet, a moving body (vehicle) includes two motors disposed in different positions in the moving direction. When one of the two motors is located in an irregular section in which the poles of magnets are not disposed regularly, a motor other than the one motor is located in a section which is not the irregular section.

11 Claims, 12 Drawing Sheets

(51) Int. Cl.
*B60L 13/03* (2006.01)
*H02K 41/03* (2006.01)
*H02P 6/16* (2016.01)
*H02K 11/00* (2016.01)
*H02P 6/15* (2016.01)
*H02K 29/03* (2006.01)

(52) U.S. Cl.
CPC ............ *H02K 41/031* (2013.01); *H02P 6/15* (2016.02); *H02P 6/16* (2013.01); *H02K 29/03* (2013.01); *H02K 2213/03* (2013.01)

(58) Field of Classification Search
USPC ......................................................... 318/503
See application file for complete search history.

(56) References Cited

U.S. PATENT DOCUMENTS

| | | | | |
|---|---|---|---|---|
| 2008/0309260 | A1* | 12/2008 | Kanai | H02P 25/06 318/38 |
| 2009/0026848 | A1* | 1/2009 | Kim | H02K 1/27 310/12.25 |
| 2011/0050007 | A1* | 3/2011 | Kubo | H02P 3/24 310/12.19 |
| 2013/0038259 | A1* | 2/2013 | Andersen | H02P 1/029 318/400.28 |
| 2014/0088753 | A1* | 3/2014 | Lim | H02P 6/14 700/168 |

FOREIGN PATENT DOCUMENTS

| | | |
|---|---|---|
| JP | 61-015502 A | 1/1986 |
| JP | 61-231805 A | 10/1986 |
| JP | 09-093723 A | 4/1997 |
| JP | 11-252970 A | 9/1999 |
| JP | 2000-245128 A | 9/2000 |
| JP | 2001-112119 A | 4/2001 |
| JP | 2002-078107 A | 3/2002 |
| JP | 2006-027421 A | 2/2006 |
| JP | 2011-050220 A | 3/2011 |
| WO | 2012167241 A1 | 12/2012 |

OTHER PUBLICATIONS

International Preliminary Report on Patentability dated Oct. 27, 2015 issued on corresponding PCT application PCT/JP2014/059843.

Extended European search report dated Nov. 16, 2016 for corresponding European application 14788736.8 cites the U.S. patent and foreign patent documents listed above.

* cited by examiner

MOVING BODY SYSTEM AND METHOD FOR DRIVING MOVING BODY

CROSS REFERENCE TO RELATED APPLICATIONS

This application is a national stage of international application no. PCT/JP2014/059843 filed on Apr. 3, 2014, and claims the benefit of priority under 35 USC 119 of Japanese application no. 2013-089408, filed on Apr. 22, 2013, which are incorporated herein by reference.

TECHNICAL FIELD

The present invention relates to a moving body system in which a moving body moves along a movement path and a method for driving a moving body.

BACKGROUND ART

There have been known moving body systems using linear motors. Among such moving body systems are those using secondary-side-on-ground type linear motors. The secondary-side-on-ground type is a type in which linear motors are mounted on a mover (moving body) and magnets are disposed on a stator (rail). As a moving body system of this type, for example, there is known a moving body system in which magnets with south poles and magnets with north poles are alternately disposed on a rail (movement path) and a moving body having linear motors mounted thereon moves along the rail, as disclosed in Patent Literature 1.

CITATION LIST

Patent Literature

[Patent Literature 1] Japanese Unexamined Patent Application Publication No. 2006-27421

SUMMARY OF INVENTION

Technical Problem

When magnets with south poles and magnets with north poles are alternately disposed on a rail, as in the moving body system disclosed in Patent Literature 1, gaps occur between magnets on the rail, unless the rail length (i.e., the length of the movement path) is an integer multiple of the pitch of a magnet. When gaps occur between magnets on the rail, the poles of the magnets and the electrical angle of a linear motor are phase-shifted. Consequently, the poles of the magnets and the electrical angle of the linear motor lose synchronization, thereby preventing the normal drive of the linear motor.

One conceivable method for avoiding a gap between magnets on the rail is to change the pitches of magnets and to arrange the magnets with the changed pitches. However, the pitches of magnets are predetermined in many cases. Accordingly, it is not easy to change the pitches of magnets. Further, changing the pitches of magnets causes problems such as a reduction in the thrust (driving force) of the linear motors.

The present invention has been made in view of the foregoing, and an object thereof is to provide a moving body system in which the length of the movement path is not limited to the pitch of a magnet, and a method for driving a moving body.

Solution to Problem

To accomplish the above object, the present invention provides a moving body system. The moving body system includes a movement path on which magnets with south poles and magnets with north poles are alternately disposed and a moving body configured to move along the movement path. The moving body includes multiple motors disposed in different positions in a moving direction thereof, and when one of the motors is located in an irregular section in which the poles of the magnets are not disposed regularly, at least one of motors other than the one motor is located in a section which is not the irregular section.

The irregular section may be a section in which the magnets are not disposed. The irregular section may also be a section in which magnets with south poles and magnets with north poles are not alternately disposed. The irregular section may be shorter than a distance between motors disposed at both ends in the moving direction, of the motors. The moving body may include a drive controller configured to stop the drive of a motor positioned in the irregular section.

The moving body may include a detector configured to detect the irregular section, and the drive controller may stop the drive of the motor on the basis of detection of the irregular section by the detector. The detector may detect the irregular section, as well as a regular section in which the poles of the magnets are disposed regularly, and when the detector detects the irregular section and then detects the regular section, the drive controller may restart the stopped drive of the motor. The detector may detect the irregular section, as well as a regular section in which the poles of the magnets are disposed regularly, by detecting the magnets, and when the detector detects the irregular section and then continuously detects multiple magnets starting from the first magnet in the regular section, the drive controller may restart the stopped drive of the motor. The detector may be provided for each of the motors. The detector is preferably an optical sensor configured to detect the magnets. The detector may serve as both detection of the irregular section and position detection of the moving body. The drive controller preferably includes a bootstrap circuit, and a bootstrap capacitor of the bootstrap circuit is preferably charged with a charge time corresponding to a time during which the motor has been stopped, a voltage required to drive the motor and charge pump characteristics of the bootstrap capacitor.

The present invention also provides a method for driving a moving body, the moving body moving along a movement path on which magnets with south poles and magnets with north poles are alternately disposed. The method includes when one of a plurality of motors disposed in different positions in a moving direction of the moving body is located in an irregular section in which the poles of the magnets are not disposed regularly, stopping the drive of the one motor.

Advantageous Effects of the Invention

According to the present embodiment, the moving body includes the multiple motors disposed in different positions in the moving direction, and when one of the plurality of motors is located in an irregular section in which the poles of the magnets are not disposed regularly, at least one of the motors other than the one motor is located in a section which is not the irregular section. Thus, the moving body can be driven normally using the at least one of the motors other than the one motor. As a result, it is possible to prevent the length of the movement path from being limited to the pitch of a magnet.

Further, irregular sections include a section in which no magnet is disposed. Thus, the moving body can be driven normally even in a section in which no magnet is disposed on the movement path. Irregular sections also include a section in which the magnets with south poles and magnets with north poles are not alternately disposed. Thus, the moving body can be driven normally even in a section in which the magnets with south poles and magnets with north poles are not alternately disposed on the movement path. Further, the moving body includes the drive controller, which stops the drive of a motor located in an irregular section. Thus, it is possible to prevent a motor and the poles of magnets from losing synchronization in an irregular section, as well as to synchronize the motor and the poles of magnets after the irregular section ends.

Further, the moving body includes the detector, which detects an irregular section, and the drive controller stops the drive of a motor on the basis of the detection of an irregular section by the detector. Thus, it is possible to reliably detect that a motor is located in an irregular section. As a result, it is possible to reliably stop the drive of the motor in the irregular section. Further, the detector is provided with each of the multiple motors and thus it is possible to reliably detect that each of the motors is located in an irregular section. Further, if the detector is an optical sensor configured to detect the magnets, it can accurately detect an irregular section using the emission and reception of light. Further, the drive controller includes the bootstrap circuit, and the bootstrap capacitor of the bootstrap circuit is charged with a charge time corresponding to the time during which the motor has been stopped. Thus, it is possible to reliably start to drive the motor within the shortest time.

BRIEF DESCRIPTION OF THE DRAWINGS

FIG. 3 is a diagram showing an irregular section on a rail, in which FIG. 3(A) is a diagram showing the state in which a first magnet absence detection sensor 11A is not located in any irregular section; and FIG. 3(B) is a diagram showing the state in which the first magnet absence detection sensor 11A is located in an irregular section.

FIG. 12 includes schematic diagrams showing bogie trucks, in which

DESCRIPTION OF EMBODIMENTS

Hereafter, an embodiment of the present invention will be described with reference to the drawings.

Figure 1:
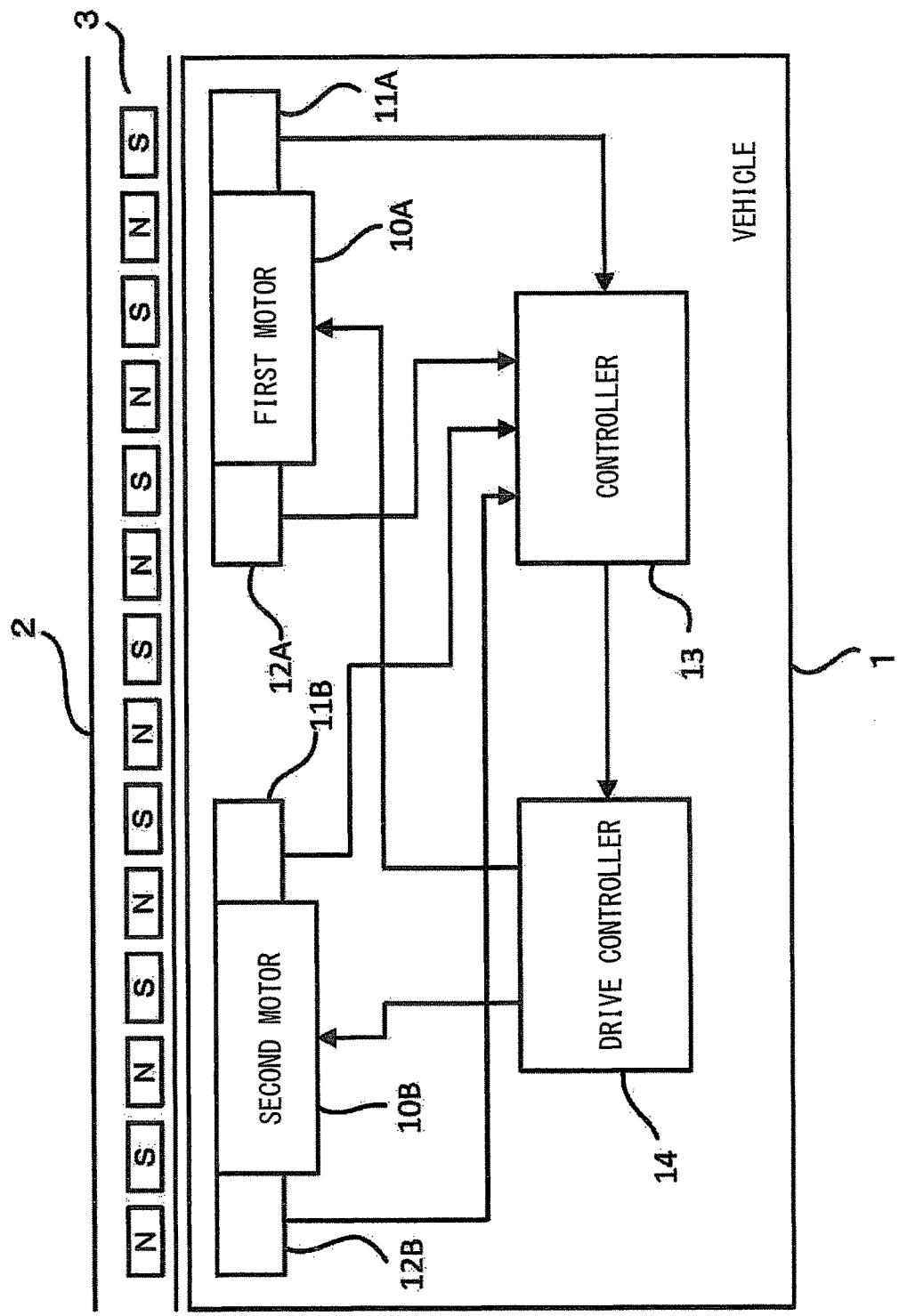
FIG. 1 is a block diagram showing a moving body system according to the present embodiment.

FIG. 1 is a block diagram showing a moving body system according to the present embodiment. The moving body system shown in FIG. 1 is a system using secondary-side-on-ground type linear motors. This moving body system includes a vehicle serving as a moving body and a rail 2 serving as the movement path of the moving body. Magnets 3 with north poles and magnets 3 with south poles are alternately disposed in a row with a predetermined pitch on the rail 2. The moving body system shown in FIG. 1 is, for example, a ceiling traveling vehicle system in which a vehicle 1 travels along a rail 2 installed on the ceiling. In the present embodiment, it is assumed that the moving body system includes a rail 2 having a length of several km and 300 to 400 vehicles 1. The moving body of the present embodiment is not limited to the vehicle 1 and may be any vehicles other than the vehicle 1 or moving bodies such as a robot arm.

The vehicle 1 includes two motors (first motor 10A, second motor 10B), two magnet absence detection sensors (first magnet absence detection sensor 11A, second magnet absence detection sensor 11B), two position detection sensors (first position detection sensor 12A, second position detection sensor 12B), a controller 13, and a drive controller 14.

The first motor 10A and second motor 10B are linear motors which change the magnetic field so that the magnets 3 with south poles and magnets 3 with north poles alternately disposed on the rail 2 and the electrical angle thereof are synchronized. For example, three-phase (U, V, and W phases) linear synchronous motors are used as the linear motors. The first motor 10A and second motor 10B are disposed in different positions in the moving direction of the vehicle 1 (in the direction of the rail 2 shown in FIG. 1). The first motor 10A and second motor 10B are disposed in positions which are opposed to magnets 3 on the rail 2 in the vehicle 1 and which are adjacent to the magnets 3. The first motor 10A is disposed in a front position in the moving direction of the vehicle 1, and the second motor 10B is disposed in a rear position in the moving direction of the vehicle 1. The front in the moving direction is referred to as front, and the rear in the moving direction is referred to as rear.

The first magnet absence detection sensor 11A and second magnet absence detection sensor 11B are detectors which detect the magnets 3 on the rail 2. The first magnet absence detection sensor 11A is a detector for detecting that the first motor 10A is located in a section in which no magnet 3 is disposed on the rail 2 (an irregular section shown in FIG. 3). The second magnet absence detection sensor 11B is a detector for detecting that the second motor 10B is located in a section in which no magnet 3 is disposed on the rail 2 (the irregular section shown in FIG. 3).

The first magnet absence detection sensor 11A and second magnet absence detection sensor 11B include, for example, photosensors that detect objects (the magnets 3 with south poles and magnets 3 with north poles in FIG. 1) by receiving light emitted by a light emitter using a light receiver. The first magnet absence detection sensor 11A and second magnet absence detection sensor 11B are also disposed in positions which are opposed to magnets 3 on the rail 2 in the vehicle 1 and which are adjacent to the magnets 3. The first magnet absence detection sensor 11A and the second magnet absence detection sensor 11B output detection signals to the controller 13.

The first position detection sensor 12A and the second position detection sensor 12B are position detectors which detect the position of the vehicle 1 on the rail 2. When the first position detection sensor 12A is located in a section in which magnets 3 are disposed on the rail 2 (a section other than an irregular section shown in FIG. 11), the position of the vehicle 1 is determined based on a position detected by the first position detection sensor 12A. When the first position detection sensor 12A is located in a section in which no magnet 3 is disposed on the rail 2 (the irregular section shown in FIG. 11), the position of the vehicle 1 is determined based on a position detected by the second position detection sensor 12B.

The first position detection sensor 12A and the second position detection sensor 12B include, for example, magnetic pole detection sensors using Hall-effect devices (magnetic conversion devices; hereafter simply referred to as "Hall devices"). The detection heads of the first position detection sensor 12A and the second position detection sensor 12B are provided with Hall devices. When the detection heads move relatively to the magnets 3 with the movement of the vehicle 1, the direction of the magnetic field with respect to the magnetosensitive surfaces of the Hall devices changes. The Hall devices output electrical signals corresponding to the changed angle. The position of the vehicle 1 on the rail 2 is detected based on the values (voltage values) of the electrical signals. The first position detection sensor 12A and the second position detection sensor 12B are also disposed in positions which are opposed to magnets 3 on the rail 2 in the vehicle 1 and which are adjacent to the magnets 3. The first position detection sensor 12A and the second position detection sensor 12B output detection signals to the controller 13.

Figure 6:
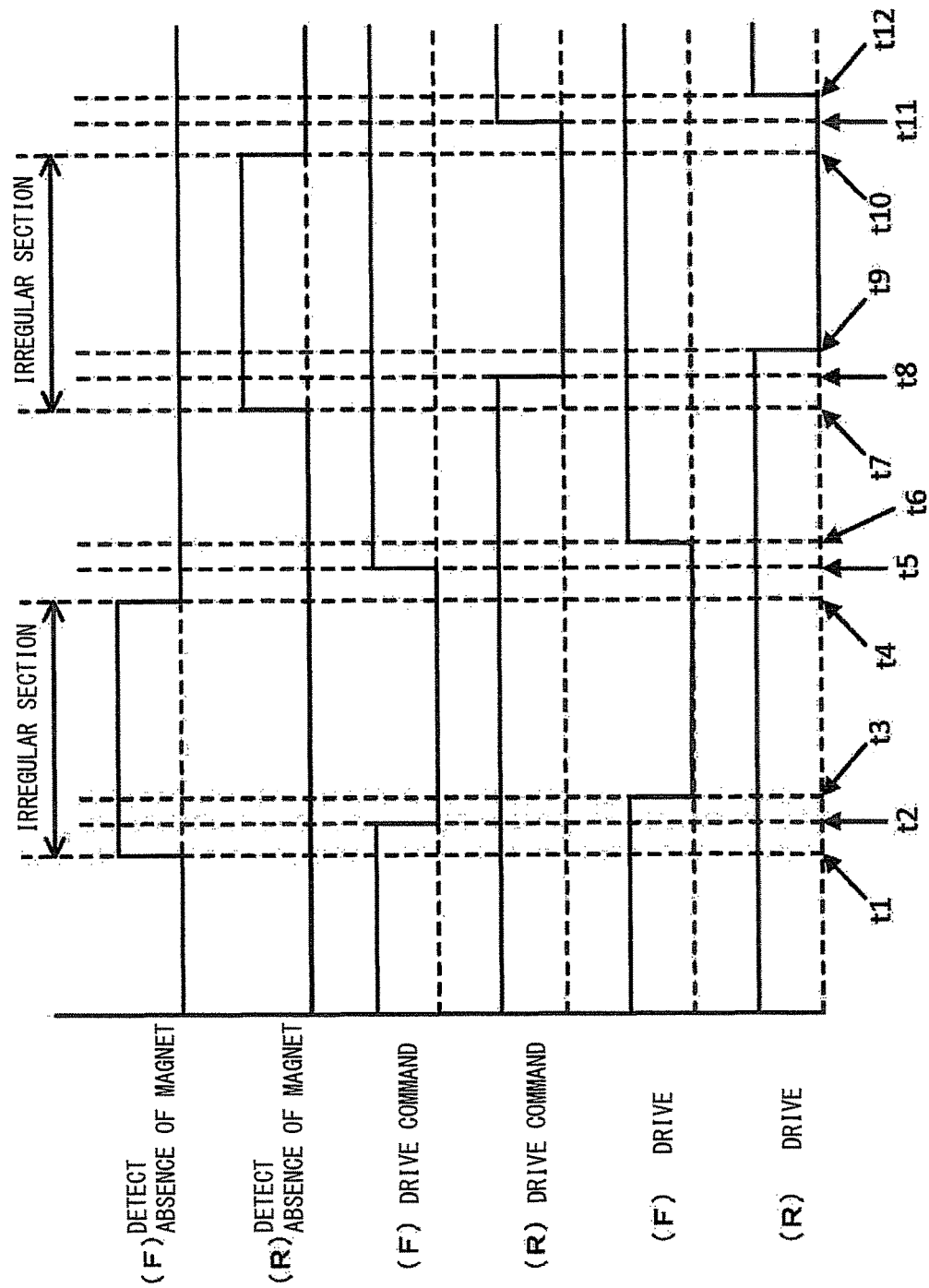
FIG. 6 is a timing chart showing the relationship between the detection of absence of a magnet and the drive of each motor.

The controller 13 determines whether the first motor 10A is located in an irregular section, on the basis of the detection signal from the first magnet absence detection sensor 11A. If the controller 13 determines that the first motor 10A is not located in any irregular section, it outputs, to the drive controller 14, a drive command instructing the drive controller 14 to drive the first motor 10A. In contrast, if the controller 13 determines that the first motor 10A is located in an irregular section, it outputs, to the drive controller 14, a drive command instructing the drive controller 14 to stop the drive of the first motor 10A. Similarly, the controller 13 determines whether the second motor 10B is located in an irregular section, on the basis of the detection signal from the second magnet absence detection sensor 11B. If the controller 13 determines that the second motor 10B is not located in any irregular section, it outputs, to the drive controller 14, a drive command instructing the drive controller 14 to drive the second motor 10B. In contrast, if the controller 13 determines that the second motor 10B is located in an irregular section, it outputs, to the drive controller 14, a drive command instructing the drive controller 14 to stop the drive of the second motor 10B. As shown in FIG. 6, when the signal level of the drive command is high, the motor 10A or 10B is driven; when the signal level thereof is low, the motor 10A or 10B is stopped.

Further, when the first position detection sensor 12A is located in a section other than an irregular section, the controller 13 determines the position of the vehicle 1 on the basis of the detection signal from the first position detection sensor 12A. In contrast, when the first position detection sensor 12A is located in an irregular section, the controller 13 determines the position of the vehicle 1 on the basis of the detection signal from the second position detection sensor 12B. Then, based on the determined position of the vehicle 1, the controller 13 outputs, to the drive controller 14, a position command instructing the drive controller 14 to move the vehicle 1 to a movement position.

The drive controller 14 controls the drive or stop of the first motor 10A on the basis of the drive command related to the first motor 10A from the controller 13. The drive controller 14 also controls the drive or stop of the second motor 10B on the basis of the drive command related to the second motor 10B from the controller 13. The drive controller 14 also controls the drive of the first motor 10A and second motor 10B so that the vehicle 1 moves to the movement position, on the basis of the position command from the controller 13.

While the first magnet absence detection sensor 11A and the first position detection sensor 12A are disposed in positions adjacent to the first motor 10A in the example shown in FIG. 1, these sensors need not necessarily be disposed in such positions. Similarly, while the second magnet absence detection sensor 11B and the second position detection sensor 12B are disposed in positions adjacent to the second motor 10B, these sensors need not necessarily be disposed in such positions.

Figure 2:
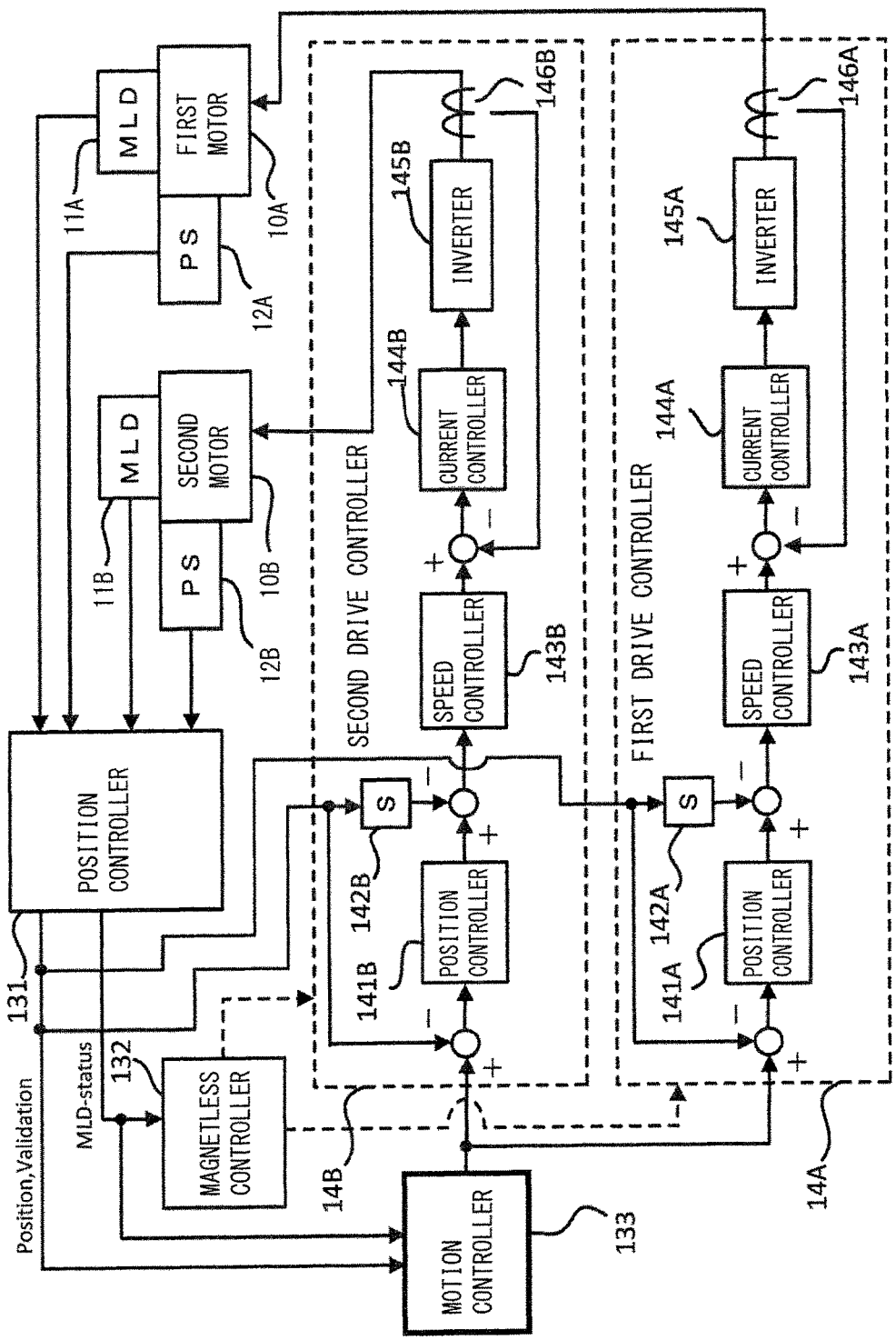
FIG. 2 is a block diagram showing the internal configurations of a controller and a drive controller.

FIG. 2 is a block diagram showing the internal configurations of the controller and drive controller. In the configuration shown in FIG. 2, the controller 13 shown in FIG. 1 includes a position controller 131, a magnetless controller 132, and a motion controller 133. The drive controller 14 shown in FIG. 1 includes a first drive controller 14A that controls the drive of the first motor 10A and a second drive controller 14B that controls the drive of the second motor 10B.

"MLD" shown in FIG. 2 represents a magnetless detect, that is, the magnet absence detection sensor 11A or 11B. "PS" shown in FIG. 2 represents a position sensor, that is, the position detection sensor 12A or 12B.

The position controller 131 determines whether the first motor 10A is located in an irregular section, on the basis of the detection signal from the first magnet absence detection sensor 11A. If the position controller 131 determines that the first motor 10A is not located in any irregular section, it outputs a magnet absence detection status signal ("MLD-status" in FIG. 2) indicating this status, to the magnetless controller 132 and motion controller 133. The position controller 131 also determines whether the second motor 10B is located in an irregular section, on the basis of the detection signal from the second magnet absence detection sensor 11B. If the position controller 131 determines that the second motor 10B is not located in any irregular section, it outputs a magnet absence detection signal indicating this status, to the magnetless controller 132 and motion controller 133.

Further, when the first position detection sensor 12A is located in a section other than an irregular section, the position controller 131 determines the position of the vehicle 1 on the basis of the detection signal from the first position detection sensor 12A. In contrast, when the first position detection sensor 12A is located in an irregular section, the position controller 131 determines the position of the vehicle 1 on the basis of the detection signal from the second position detection sensor 12B. The position controller 131 then outputs position information indicating the determined current position of the vehicle 1 to the motion controller 133, first drive controller 14A, and second drive controller 14B.

The magnetless controller 132 outputs, to the first drive controller 14A, a drive command instructing the first drive controller 14A to drive or stop (on/off of drive) the first motor 10A, on the basis of the magnet absence detection signal related to the first motor 10A from the position controller 131. The magnetless controller 132 also outputs, to the second drive controller 14B, a drive command instructing the second drive controller 14B to drive or stop the second motor 10B, on the basis of the magnet absence detection signal related to the second motor 10B from the position controller 131.

The motion controller 133 determines whether the first motor 10A and second motor 10B are located in an irregular section, on the basis of the magnet absence detection signals from the position controller 131. The motion controller 133 also checks the current position of the vehicle 1 on the basis of the position information from the position controller 131. The motion controller 133 then outputs, to the drive controller 14A or 14B of the motor 10A or 10B which is not located in any irregular section, a position command instructing the drive controller to move the vehicle 1 to a predetermined position (the movement position to which the vehicle 1 is to be moved).

The first drive controller 14A includes a position controller 141A, a differentiator 142A, a speed controller 143A, a current controller 144A, an inverter 145A, and a coil 146A. The position controller 141A receives data about the difference between the movement position indicated by the position command from the motion controller 133 and the current position indicated by the position information from the position controller 131 (position difference data). The position controller 141A then outputs speed data corresponding to the position difference data. The speed controller 143A receives data about the difference between the speed data from the position controller 141A and data obtained by differentiating the position information from the position controller 131 in the differentiator 142A (speed difference data). The speed controller 143A then outputs current value data corresponding to the speed difference data.

The current controller 144A receives data of the difference between the current value data from the speed controller 143A and feedback data corresponding to the present current value from a coil (load) 146A (that is, an actual current signal fed back based on the end-to-end voltage of a resistor which detects the current supplied to the coil 146A) (current value difference data). The current controller 144A then outputs a drive current corresponding to the current value difference data. The inverter 145A is a device which converts the direct drive current from the current controller 144A into an alternating drive current. The inverter 145A is a three-phase inverter using an intelligent power module (IPM). The alternating drive current converted by the inverter 145A is outputted to the first motor 10A.

The second drive controller 14B includes a position controller 141B, a differentiator 142B, a speed controller 143B, a current controller 144B, an inverter 145B, and a coil 146B. The configurations of the units in the second drive controller 14B are similar to those in the first drive controller 14A and therefore will not be described.

Figure 3:
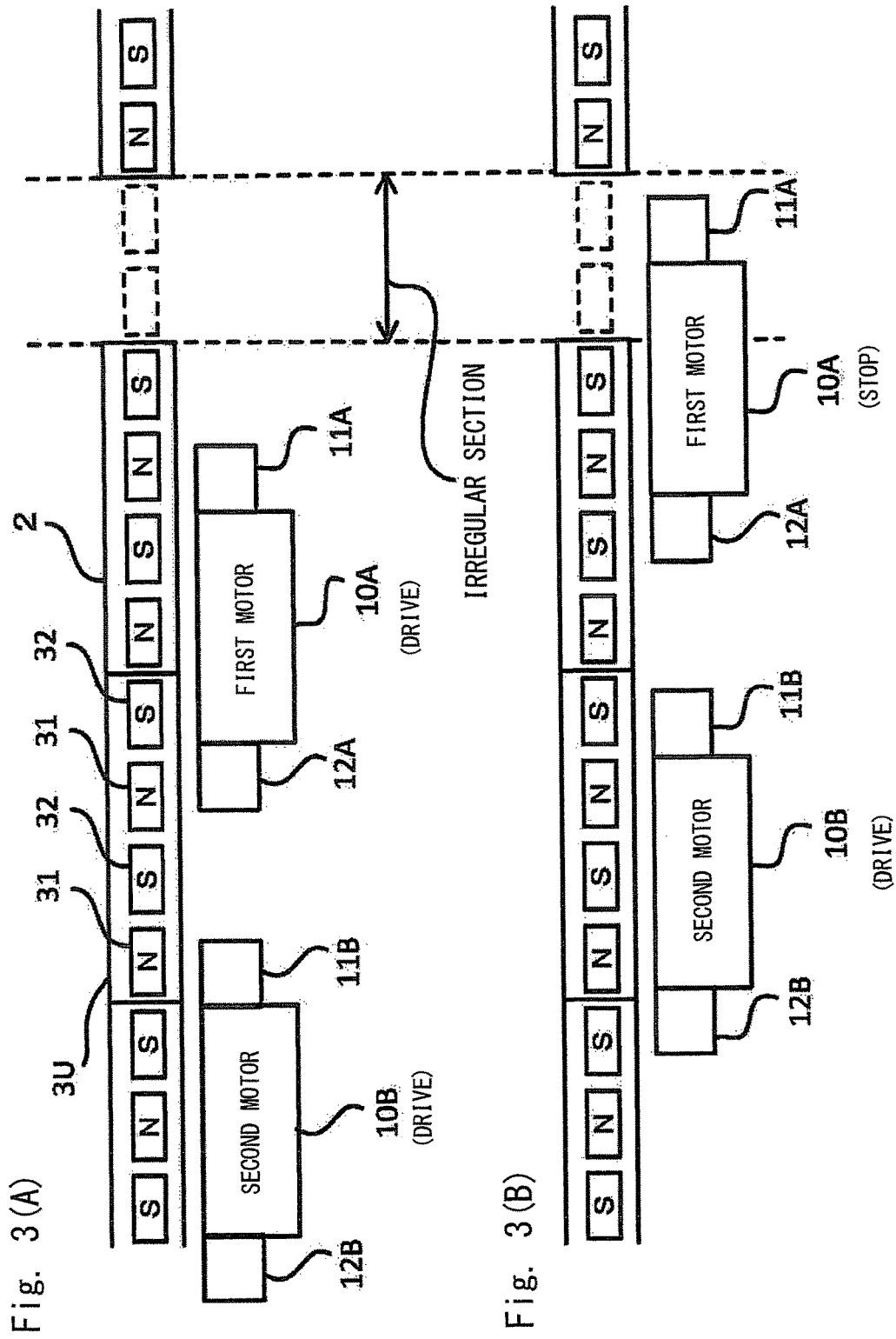

FIG. 3 includes diagrams showing an irregular section on the rail, in which FIG. 3(A) is a diagram showing the state in which the first magnet absence detection sensor 11A is not located in any irregular section; and FIG. 3(B) is a diagram showing the state in which the first magnet absence detection sensor 11A is located in an irregular section. As shown in FIG. 3, in the present embodiment, magnet units 3U are arranged on the rail 2, and two sets of a magnet 31 with a north pole and a magnet 32 with a south pole (a total of four magnets 3) are disposed in each magnet unit 3U. When a worker installs magnet units 3U as shown in FIG. 3, the workload of the worker is significantly reduced compared to that when the worker installs magnets 3 one by one. On the other hand, when the worker arranges magnet units 3U on the rail 2, the length of the rail 2 must be an integral multiple of that of a magnet unit 3U. Thus, an irregular section in which no magnet 3 is disposed would easily occur on the rail 2. Further, the generated irregular section would have a long length. In the example shown in FIG. 3, there is generated an irregular section corresponding to about twice the pitch of a magnet.

In the example shown in FIG. 3(A), both the first magnet absence detection sensor 11A and second magnet absence detection sensor 11B have yet to enter the irregular section. Accordingly, both the first motor 10A and second motor 10B are being driven. In the example shown in FIG. 3(B), on the other hand, the second magnet absence detection sensor 11B has yet to enter the irregular section, whereas the first magnet absence detection sensor 11A has entered the irregular section. Accordingly, only the second motor 10B is being driven, and the first motor 10A is not being driven (that is, the drive of the first magnet absence detection sensor 11A is being stopped). Subsequently, when the vehicle 1 moves in the traveling direction, the second magnet absence detection sensor 11B enters the irregular section. In this case, the drive of the second motor 10B is stopped.

In the present embodiment, an "irregular section" refers to a section in which the poles of magnets are not disposed regularly, that is, a section in which magnets 31 with north poles and magnets 32 with south poles are not disposed regularly. Accordingly, "irregular sections" include sections in which no magnet 3 is disposed, as well as sections in which magnets 31 with north poles and magnets 32 with south poles are not alternately disposed. "Irregular sections" also include sections in which magnets 3 have weakening magnetic forces. Even in such sections, control is performed such that the motor 10A or 10B is stopped.

In the present embodiment, when one (e.g., first motor 10A) of the two motors, 10A and 10B, is located in an irregular section in which the poles of magnets 3 are not disposed regularly, the motor (e.g., second motor 10B) other than the one motor is located in a section which is not the irregular section. As seen above, the length of an irregular section is shorter than the distance between the motors (e.g., between the two motors, 10A and 10B) which are among multiple motors and which are disposed at both ends in the moving direction. According to this configuration, even when one motor is located in an irregular section, the vehicle 1 can be moved by driving the other motor. This configuration requires at least that the length of any irregular section be shorter than the distance between the two motors, 10A and 10B. Accordingly, when the distance between the two motors, 10A and 10B, is previously known, the length of any irregular section is set to a length shorter than that distance.

Figure 4:
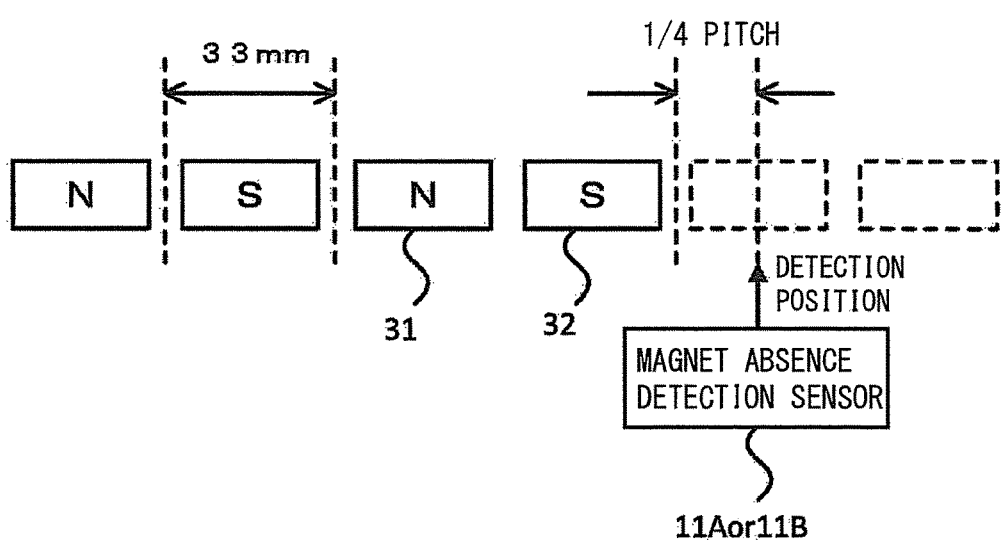
FIG. 4 is a diagram showing the position in which a magnet absence detection sensor detects an irregular section.

FIG. 4 is a diagram showing the position in which a magnet absence detection sensor detects an irregular section.

As shown in FIG. 4, it is assumed in the present embodiment that the pitch of one magnet 3 (a magnet 31 with a north pole and a magnet 32 with a south pole) in the moving direction of the vehicle 1 is 33 mm. When the magnet absence detection sensor 11A or 11B enters an area having no magnet 3 and then comes to a position corresponding to at least ¼ of the pitch of a magnet 3, the magnet absence detection sensor detects that it has just entered an irregular section. The reason is that, assuming that the phase of the magnetic pole is 360° (2π) in the pitch of a set of a magnet 31 with a north pole and a magnet 32 with a south pole (the pitch of two magnets 3), when the magnetic pole and the electrical angle of the motor 10A or 10B are 90° (π/2) phase-shifted, the horizontal thrust becomes cos 90°, and the vertical force becomes sin 90°. That is, the thrust is lost, whereas the large vertical force works. In this case, when the vertical force works, the motor 10A or 10B and magnets 3 may adsorb each other, or the vehicle 1 may jump. When such a situation is repeated, the magnets 3 may be demagnetized. To avoid such an event, when the motor 10A or 10B is located in an irregular section, the drive of the motor 10A or 10B is stopped.

Since the magnet absence detection sensor 11A or 11B determines whether the motor 10A or 10B is located in an irregular section, it is preferable that the position of the magnet absence detection sensor 11A or 11B and the position of the motor 10A or 10B be identical or close to each other. However, if the distance between the position of the magnet absence detection sensor 11A or 11B and the position of the motor 10A or 10B is previously known, the time period from the time point when the magnet absence detection sensor 11A or 11B enters an irregular section to the time point when the motor 10A or 10B enters the irregular section can be predicted based on the distance and with reference to the current speed of the vehicle 1.

Next, the operation of the moving body system will be described.

Figure 5:
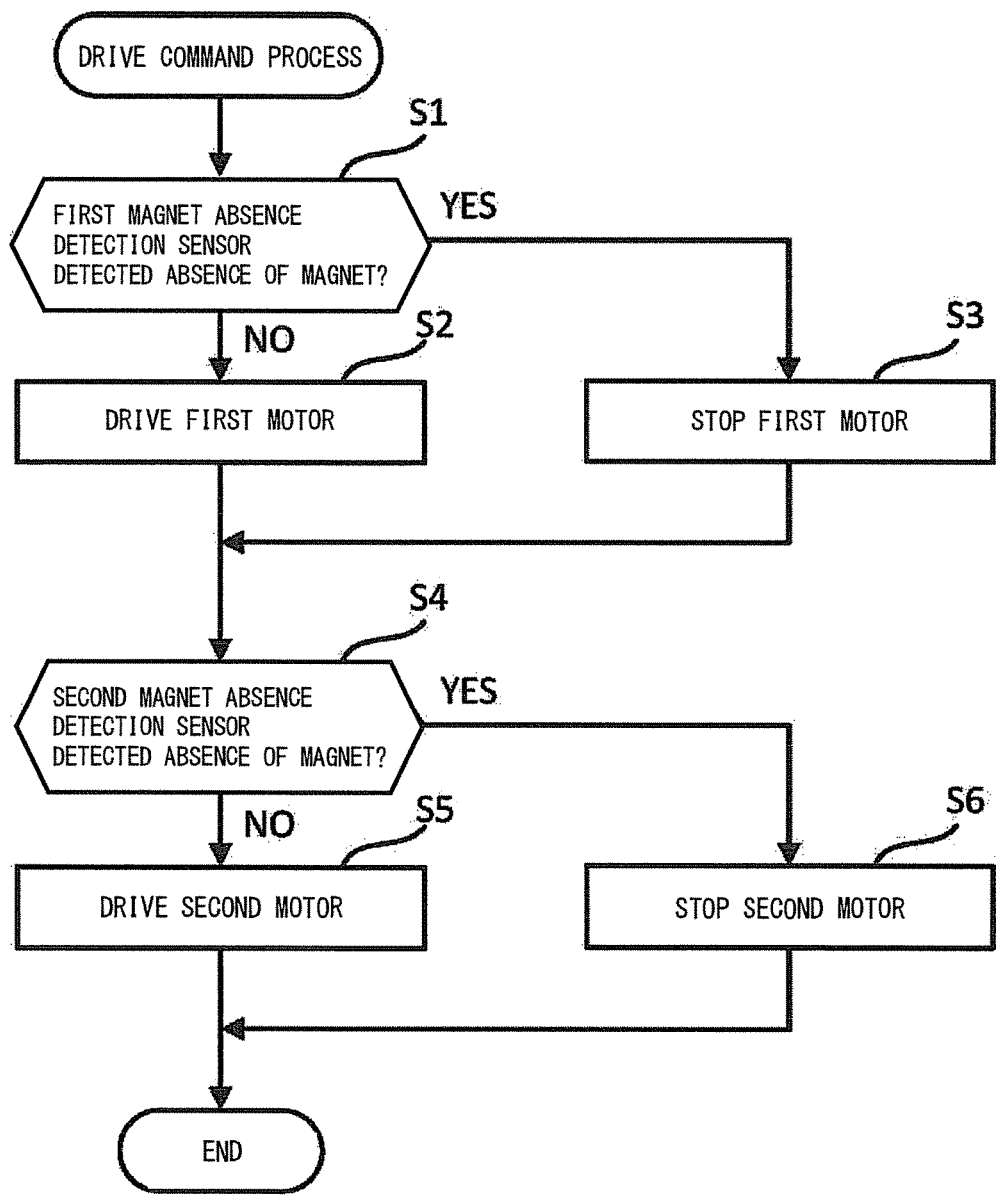
FIG. 5 is a flowchart showing a drive command process performed by the controller.

(1) Motor Drive Control Based on Detection Signals of Magnet Absence Detection Sensors 11A, 11B FIG. 5 is a flowchart showing a drive command process performed by the controller. FIG. 6 is a timing chart showing the relationship between the detection of absence of a magnet and the drive of a motor. In FIG. 6, (F) represents the front, and (R) represents the rear.

As shown in FIG. 5, the controller 13 always checks the detection signal from the first magnet absence detection sensor 11A (step S1). If the first magnet absence detection sensor 11A has yet to detect the absence of a magnet (NO in step S1), the controller 13 continuously drives the first motor 10A (step S2). Specifically, the controller 13 continuously outputs, to the first drive controller 14A, a drive command instructing the first drive controller 14A to drive the first motor 10A.

In contrast, if the first magnet absence detection sensor 11A detects the absence of a magnet (YES in step S1), the controller 13 causes the first drive control unit 14A to stop the drive of the first motor 10A (step S3). Specifically, the controller 13 outputs, to the first drive controller 14A, a drive command instructing the first drive controller 14A to stop of the drive of the first motor 10A.

More specifically, steps S1 to S3 are performed as follows. Until time t1 in FIG. 6, the controller 13 determines that the first magnet absence detection sensor 11A has yet to detect the absence of a magnet, since the level of the detection signal from the first magnet absence detection sensor 11A is low. During this period of time, the controller 13 outputs, to the first drive controller 14A, a drive command instructing the first drive controller 14A to drive the first motor 10A. As shown in FIG. 6, the drive command instructing the first drive controller 14A to drive the first motor 10A is a high-level signal. At time t1 in FIG. 6, the level of the detection signal from the first magnet absence detection sensor 11A is changed from the low level to a high level. Thus, the controller 13 determines that the first magnet absence detection sensor 11A has detected the absence of a magnet. The controller 13 then outputs, to the first drive controller 14A, a drive command instructing the first drive controller 14A to stop the drive of the first motor 10A. As shown in FIG. 6, the drive signal instructing the first drive controller 14A to stop the first motor 10A is a low-level signal. The time period from time t1 to time t2 in FIG. 6 is the time lag between the time point when the controller 13 determines that the level of the detection signal has changed to the high level and the time point when the controller 13 changes the level of the drive command to a low level. If there is a distance between the first magnet absence detection sensor 11A and first motor 10A, this time period is the time period from the time point when the first magnet absence detection sensor 11A enters an irregular section to the time point when the first motor 10A enters the irregular section.

The first drive controller 14A controls the status of the first motor 10A from the drive status to a stop status on the basis of the drive command from the controller 13. As shown in FIG. 6, when the first motor 10A is being driven, the level of the drive command is high; when the first motor 10A is being stopped, the level of the drive command is low. The time period from time t2 to time t3 in FIG. 6 is the time lag between the time point when the first drive controller 14A determines that the level of the drive command has changed to the low level and the time point when the first drive controller 14A actually stops the first motor 10A.

At time t4 in FIG. 6, the detection signal from the first magnet absence detection sensor 11A changes from the high level to a low level. Thus, the controller 13 determines that the first magnet absence detection sensor 11A no longer detects the absence of a magnet. The controller 13 then outputs, to the first drive controller 14A, a drive command instructing the first drive controller 14A to drive the first motor 10A. The time period from time t4 to time t5 in FIG. 6 is the time lag between the time point when the controller 13 determines that the detection signal has changed to a low-level signal and the time point when the controller 13 changes the level of the drive command to a high level. If there is a distance between the first magnet absence detection sensor 11A and first motor 10A, this time period is the time period from the time point when the magnet absence detection sensor 11A or 11B exits an irregular section to the time point when the motor 10A or 10B exits the irregular section.

The first drive controller 14A controls the status of the first motor 10A from the stop status to a drive status on the basis of the drive command from the controller 13. The time period from time t5 to time t6 in FIG. 6 is the time lag between the time point when the first drive controller 14A determines that the level of the drive command has changed to a high level and the time point when the first drive controller 14A actually drives the first motor 10A.

Referring back to FIG. 5, the controller 13 always checks the detection signal from the second magnet absence detection sensor 11B (step S4). If the second magnet absence detection sensor 11B has yet to detect the absence of a magnet (NO in step S4), the controller 13 continuously drives the second motor 10B (step S5). Specifically, the controller 13 continuously outputs, to the second drive controller 14B, a drive command instructing the second drive controller 14B to drive the second motor 10B.

In contrast, if the second magnet absence detection sensor 11B detects the absence of a magnet (YES in step S4), the controller 13 stops the drive of the second motor 10B (step S5). Specifically, the controller 13 outputs, to the second drive controller 14B, a drive command instructing the second drive controller 14B to stop the drive of the second motor 10B.

More specifically, steps S4 to S6 are performed as follows. Until time t7 in FIG. 6, the controller 13 determines that the second magnet absence detection sensor 11B has yet to detect the absence of a magnet, since the level of the detection signal from the second magnet absence detection sensor 11B is low. During this time period, the controller 13 outputs, to the second drive controller 14B, a drive command instructing the second drive controller 14B to drive the second motor 10B. At time t7 in FIG. 6, the level of the detection signal from the second magnet absence detection sensor 11B changes from the low level to a high level. Thus, the controller 13 determines that the second magnet absence detection sensor 11B has detected the absence of a magnet. The controller 13 then outputs, to the second drive controller 14B, a drive command instructing the second drive control unit 14B to stop the drive of the second motor 10B. The time period from time t7 to time t8 in FIG. 6 is the time lag between the time point when the controller 13 determines that the level of the detection signal has changed to the high level and the time point when the controller 13 changes the level of the drive command to a low level. If there is a distance between the second magnet absence detection sensor 11B and second motor 10B, this time period is the time period from the time point when the second magnet absence detection sensor 11B enters an irregular section to the time point when the second motor 10B enters the irregular section.

The second drive controller 14B controls the status of the second motor 10B from the drive status to a stop status on the basis of the drive command from the controller 13. As shown in FIG. 6, when the second motor 10B is being driven, the level of the drive command is high; when the second motor 10B is being stopped, the level thereof is low. The time period from time t8 to time t9 in FIG. 6 is the time lag between the time point when the second drive controller 14B determines that the level of the drive command has changed to the low level and the time point when the second drive controller 14B actually stops the second motor 10B.

At time t10 in FIG. 6, the level of the detection signal from the second magnet absence detection sensor 11B changes from the high level to a low level. Thus, the controller 13 determines that the second magnet absence detection sensor 11B no longer detects the absence of a magnet. The controller 13 then outputs, to the second drive controller 14B, a drive command instructing the second drive controller 14B to drive the second motor 10B. The time period from time t10 to time t11 in FIG. 6 is the time lag between the time point when the controller 13 determines that the level of the detection signal has changed to the low level and the time point when the controller 13 changes the level of the drive command to a high level. If there is a distance between the second magnet absence detection sensor 11B and second motor 10B, this time period is the time period from the time point when the second magnet absence detection sensor 11B exits an irregular section to the time point when the second motor 10B exits the irregular section.

The second drive controller 14B controls the status of the second motor 10B from the stop status to a drive status on the basis of the drive command from the controller 13. The time period from time t11 to time t12 in FIG. 6 is the time lag between the time point when the second drive controller 14B determines that the level of the drive command has changed to the high level and the time point when the second drive controller 14B actually drives the second motor 10B.

In the present embodiment, when the first motor 10A or second motor 10B is located in an irregular section, the controller 13 stops the drive of the first motor 10A or second motor 10B. Accordingly, when the first motor 10A or second motor 10B is located in an irregular section, the first motor 10A or second motor 10B and magnets 3 are prevented from losing synchronization.

Further, when the first motor 10A or second motor 10B moves from the irregular section to a regular section (a section in which the magnets 31 with north poles and magnets 32 with south poles are alternately regularly disposed), the controller 13 starts to drive the first motor 10A or second motor 10B. Specifically, at the time point when the first motor 10A or second motor 10B moves to the regular section (at the time point when the irregular section ends), the controller 13 outputs a drive command to the drive controller 14, as well as newly outputs a position command to the drive controller 14. Thus, the drive controller 14 controls the drive of the first motor 10A or second motor 10B so that the position of the first motor 10A or second motor 10B and the positions of magnets 3 are synchronized. As a result, after the first motor 10A or second motor 10B passes through the irregular section, the electrical angle of the first motor 10A or second motor 10B and the poles of magnets 3 are prevented from losing synchronization.

Note that after the irregular section ends, the drive control unit 14 may start to drive the first motor 10A or second motor 10B in the position of the severalth magnet 3 in the regular section rather than starting to drive the first motor 10A or second motor 10B in the position of the first magnet 3 in the regular section. Specifically, at the time point when the first magnet absence detection sensor 11A or second magnet absence detection sensor 11B has continuously detected several magnets 3 in the regular section, the controller 13 may output a drive command to the drive controller 14, as well as may newly output a position command to the drive controller 14. That is, when the first magnet absence detection sensor 11A or second magnet absence detection sensor 11B serving as a detector detects an irregular section and then detects a regular section, in which the poles of magnets 3 are disposed regularly, the drive controller 14 may restart to drive the first motor 10A or second motor 10B, which has been stopped. In this case, when the first magnet absence detection sensor 11A or second magnet absence detection sensor 11B detects the irregular section and then continuously detects several magnets starting from the first magnet 3 in the regular section, the drive controller 14 may restart to drive the first motor 10A or second motor 10B, which has been stopped. According to this configuration, when the regular section starts, the electrical angle of the first motor 10A or second motor 10B and the positions of magnets 3 can be reliably synchronized.

(2) Operation of Bootstrap Circuit

Figure 7:
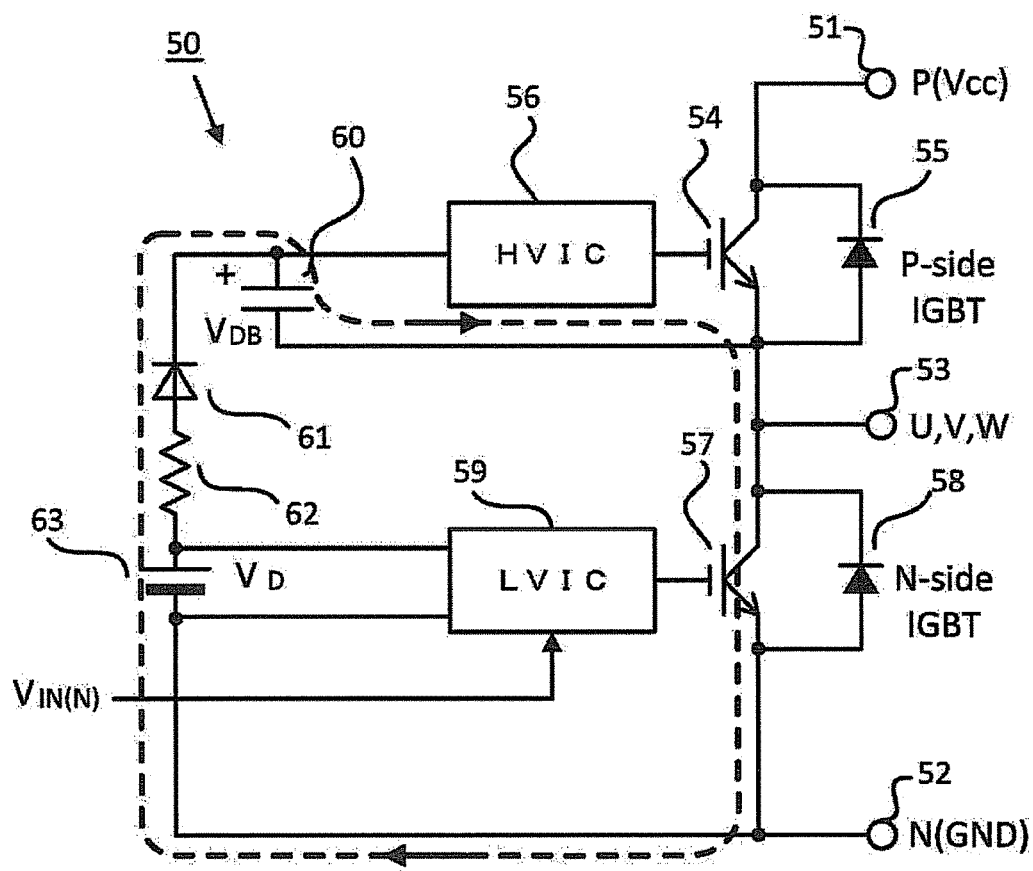
FIG. 7 is a circuit diagram showing the configuration of a bootstrap circuit implemented in an inverter.

Next, there will be described the configuration of a bootstrap circuit implemented in each of the inverters 145A and 145B of the drive controllers 14A and 14B. FIG. 7 is a circuit diagram showing the configuration of a bootstrap circuit implemented in each inverter. A bootstrap circuit 50 is implemented in each of the inverters 145A and 145B.

Thus, although driving insulated gate bipolar transistors (IGBTs) in a traditional circuit configuration requires respective power supplies, IGBTs in each inverter can be operated by a single power supply. By turning on one of the IGBTs when starting the motor, a capacitor (bootstrap capacitor) is charged. While the one IGBT is driven, the capacitor is used as a power supply for driving the other IGBT.

On the other hand, by turning off one IGBT, the capacitor is discharged. For this reason, when starting the motor, it is necessary to ensure a sufficient time to apply, to the capacitor, an amount of charge required to drive the other IGBT. When all the IGBTs are turned off to completely stop the output of the inverter 145A or 145B, the stopped motor cannot be started quickly. Particularly in the present embodiment, when the motor 10A or 10B is located in an irregular section, the output of the inverter 145A or 145B is stopped to stop the drive of the motor 10A or 10B; and subsequently, when the motor 10A or 10B exits the irregular section, the output of the inverter 145A or 145B is started to drive the motor 10A or 10B (see FIG. 6). Accordingly, in the present embodiment, the stopped motor must be started quickly.

The configuration of the bootstrap circuit 50 implemented in each inverter will be described. The bootstrap circuit 50 includes a bootstrap capacitor 60, a bootstrap diode (high-voltage, high-speed diode) 61, and a current limiting resistor 62. In FIG. 7, the collector terminal of a P-side IGBT 54 (hereafter referred to as the IGBT 54) and a P terminal 51 for receiving a voltage Vcc are connected together, and the emitter terminal of the IGBT 54 and an output terminal 53 for each phase (e.g., U terminal, etc.) are connected together. A high-voltage IC (HVIC) 56 is connected to the gate terminal of the IGBT 54. A diode 55 for commutating the load current is connected between the collector terminal and emitter terminal of the IGBT 54. The HVIC 56 is an IC circuit which directly drives the gate of the IGBT 54, which is the high voltage side, on the basis of an input signal from a microcomputer (the microcomputer of the drive controller 14A or 14B in the present embodiment) or the like.

The collector terminal of an N-side IGBT 57 (hereafter referred to as the IGBT 57) and the output terminal 53 for each phase are connected together, and the emitter terminal of the IGBT 57 and an N terminal 52 having a ground-level potential are connected together. A low-voltage IC (LVIC) 59 is connected to the gate terminal of the IGBT 57. A diode 58 for commutating the load current is connected between the collector terminal and emitter terminal of the IGBT 57. The LVIC 59 is an IC circuit which directly drives the gate of the IGBT 57, which is the low voltage side, on the basis of an input signal from a microcomputer (the microcomputer of the drive controller 14A or 14B in the present embodiment) or the like.

The bootstrap capacitor 60 is connected between an input connection point of the HVIC 56 and the output terminal 53 for each phase. The bootstrap diode 61 and current limiting resistor 62 are connected in series between the input connection point of the HVIC 56 and an input connection point of the LVIC 59. A power supply VD 63 is a power supply for driving the IGBT 57. The power supply VD 63 is connected between the collector terminal and emitter terminal of the IGBT 57.

When, during the drive of the inverter 145A or 145B, the HVIC 56 turns on the IGBT 55 and the LVIC 59 turns off the IGBT 57, the potential of the output terminal 53 for each phase becomes a Vcc-level potential. In contrast, when the HVIC 56 turns off the IGBT 55 and the LVIC 59 turns on the IGBT 57, the potential of the output terminal 53 for each phase becomes a ground-level potential. By repeatedly performing these operations, pulse width modulation (PWM) control is performed.

Figure 8:
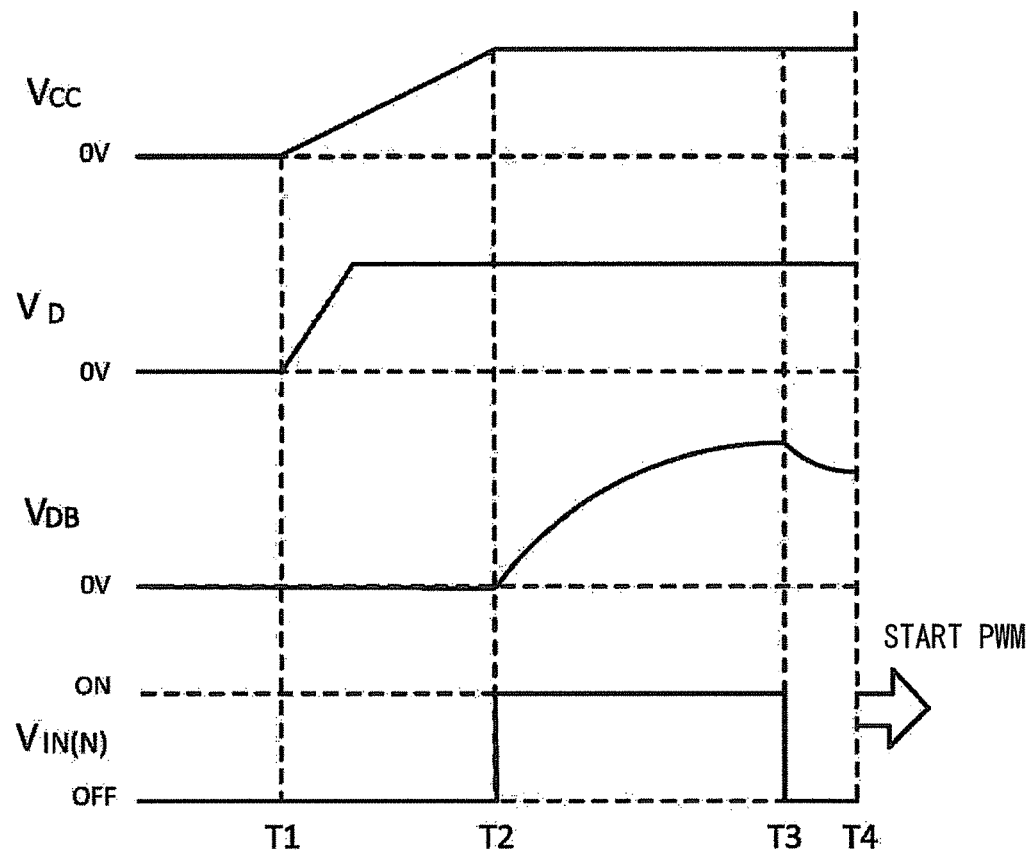
FIG. 8 is a timing chart showing the relationships among voltages in the bootstrap circuit when performing an initial charge.

FIG. 8 is a timing chart showing the relationships among the voltages in the bootstrap circuit when performing an initial charge. From initial time point T1, first, the voltage Vcc gradually increases, and the voltage VD increases. At time point T2, the voltage Vcc becomes a predetermined voltage, and the microcomputer inputs a pulse voltage VIN(N) to the LVIC 59. When the pulse voltage VIN(N) is inputted to the LVIC 59, the LVIC 59 drives the IGBT 57, which is then turned on. When the IGBT 57 is turned on, the current flows in the form of a loop as shown in FIG. 7, so that the bootstrap capacitor 60 is charged. As the bootstrap capacitor 60 is charged, the charge voltage VDB of the bootstrap capacitor 60 gradually increases. At time point T3, the HVIC 56 drives and turns on the IGBT 54. Thus, the amount of charge of the bootstrap capacitor 60 is used to drive the UGBT 54, so that the charge voltage VDB gradually decreases.

Figure 9:
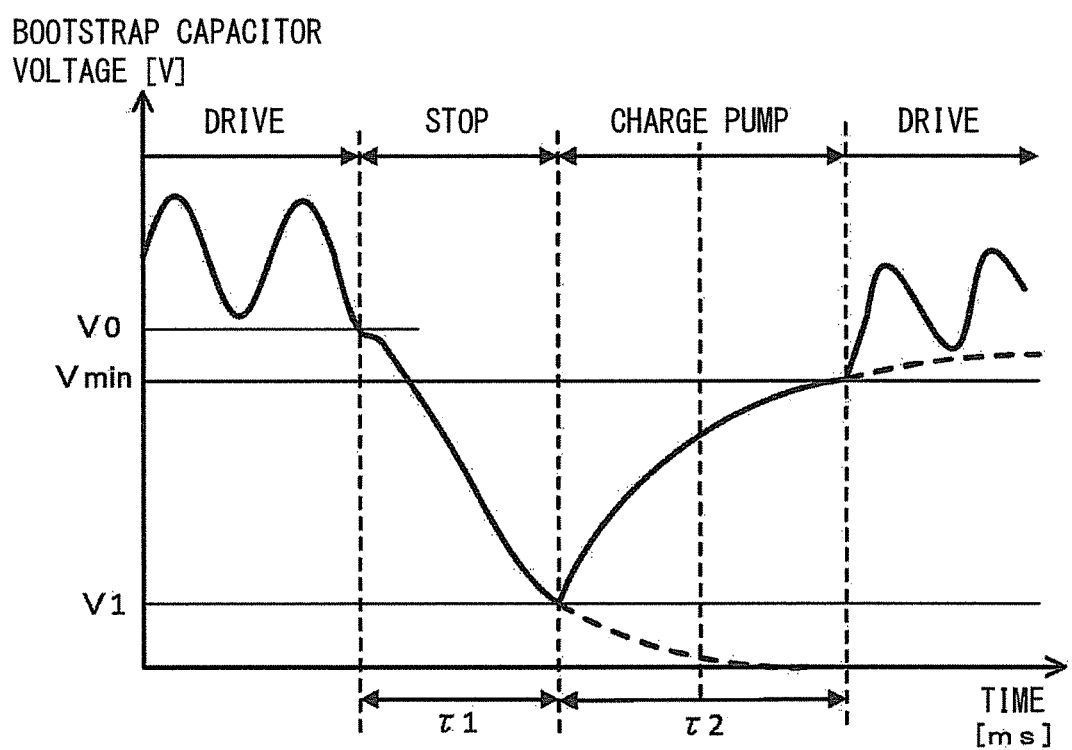
FIG. 9 is a diagram showing the voltage waveform of a bootstrap capacitor.

FIG. 9 is a diagram showing the voltage waveform of the bootstrap capacitor. As shown in FIG. 9, when the motor is in a drive status (inverter 145A or 145B is being driven), charge and discharge are repeated. Accordingly, the charge voltage VDB of the bootstrap capacitor 60 repeatedly increases and decreases. The charge voltage VDB must be a voltage Vmin or more so that the bootstrap capacitor 60 serves as a power supply for driving the IGBT 54.

When the motor is placed in a stop status (the drive of the inverter 145A or 145B is stopped), the charge voltage VDB of the bootstrap capacitor 60 gradually decreases. Subsequently, the IGBT 57 is turned on before the motor is placed in a drive status. Thus, the charge voltage VDB of the bootstrap capacitor 60 gradually increases. At the time point when the charge voltage VDB becomes the voltage value Vmin, the drive of the inverter 145A or 145B is started, and the motor is placed in a drive status.

As shown in FIG. 9, when the motor makes a transition from the drive status to the stop status, the value V1 of the charge voltage after a time $\tau 1$ elapsed since the time point of the stop of the motor (specifically, the time point of turn-off of the IGBT 57) (that is, after the time period during which the motor has been stopped) becomes $V1=F(\tau 1, V0)$ due to the discharge characteristics of the capacitor.

The value V2 of the charge voltage VDB after a time $\tau 2$ elapsed since the restart of the charge pump becomes $V2=G(\tau 2, V1)$ due to the charge pump characteristics of the capacitor. By solving this equation with respect to $\tau 2$, $\tau 2=g(V1, V2)$ is obtained. Assuming that the voltage required to drive the P-side IGBT 54 is Vmin, $\tau 2=g(F(\tau 1, V0), Vmin)$ is calculated. Typically, a voltage value V0 is designed as the lowest value during the drive and calculated using an equation $\tau 2=f(\tau 1)$ as a fixed value along with the voltage value Vmin.

Thus, the motor can be placed in a drive status at the time point when the value V2 of the charge voltage of VDB becomes the voltage value Vmin or more after the restart of the charge pump. Accordingly, by determining the charge time $\tau 2$ in accordance with the time $\tau 1$ during which the motor has been stopped (the time during which the bootstrap capacitor 60 has been discharged), the IGBT 54 can be turned on reliably within the shortest time.

To realize this configuration, the microcomputer or the like of the drive controller 14 measures the time from the time point when the P-side IGBT 57 is turned off to the time point when the charge pump is started and calculates a charge time corresponding to the measured time. Then, the bootstrap capacitor 60 is charged with the charge time calculated by the microcomputer or the like.

(3) Position Control Based on Detection Signals of Position Detection Sensors 12A and 12B

Figure 10:
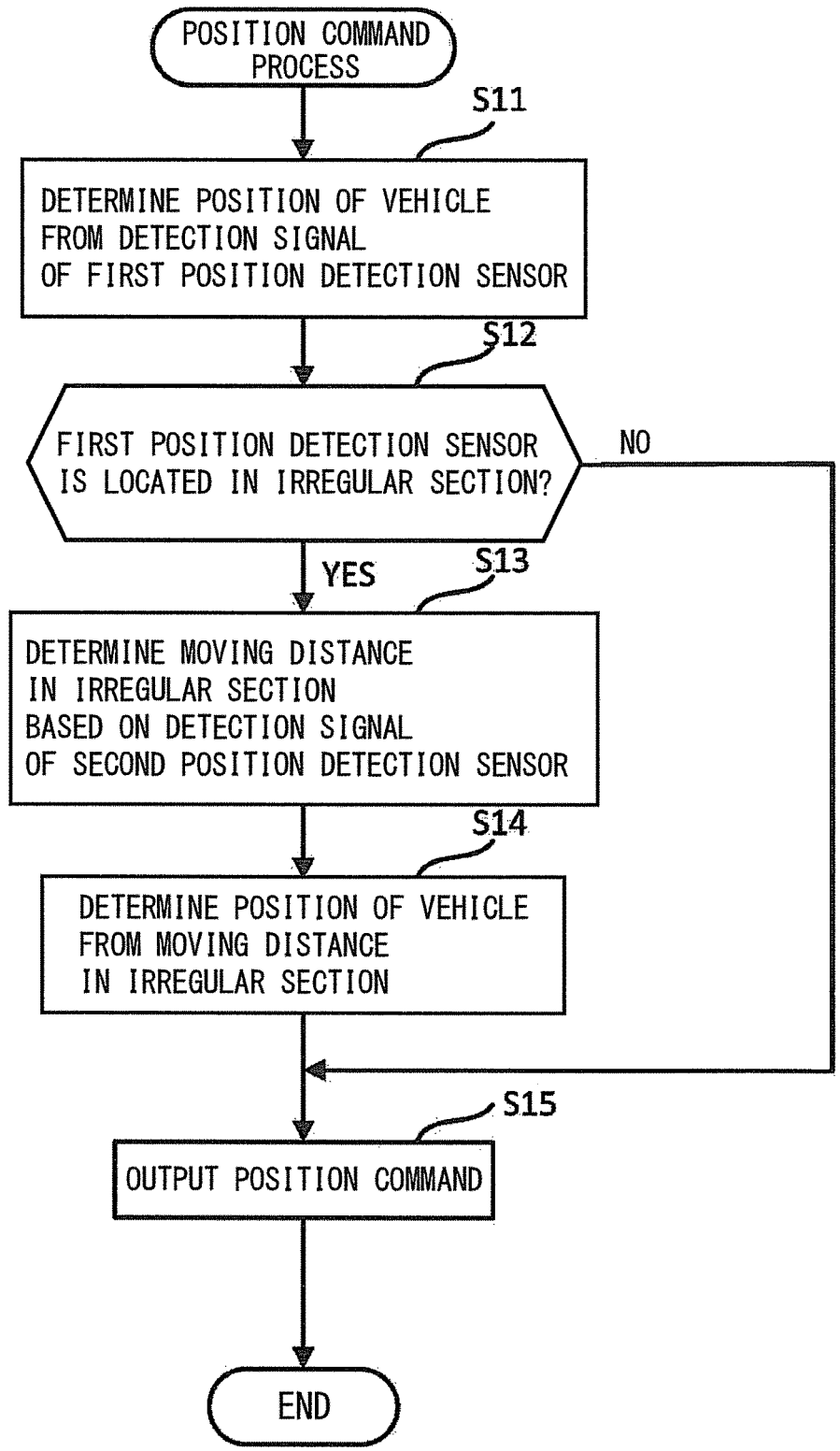
FIG. 10 is a flowchart showing a position command process performed by the controller.

FIG. 10 is a flowchart showing a position command process performed by the controller. As shown in FIG. 10, the controller 13, as described above, always monitors the detection signals from the first position detection sensor 12A and second position detection sensor 12B. The controller 13 determines the current position of the vehicle 1 on the basis of the detection signal from the first position detection sensor 12A (step S11).

The controller 13 also determines whether the first position detection sensor 12A is located in an irregular section, on the basis of the detection signal from the first position detection sensor 12A (step S12). If the controller 13 determines that the first position detection sensor 12A is not located in any irregular section (NO in step S12), it outputs a position command indicating the movement position of the vehicle 1 to the drive controller 14 on the basis of the current position of the vehicle 1 determined in step S11 (step S15). Specifically, the motion controller 133 of the controller 13 outputs a position command to the first drive controller 14A, provided that the motion controller 133 has received, from the position controller 131, a magnet absence detection status signal indicating that the first motor 10A is not located in any irregular section. Similarly, the motion controller 133 outputs a position command to the second drive controller 14B, provided that the motion controller 133 has received, from the position controller 131, a magnet absence detection status signal indicating that the second motor 10B is not located in any irregular section.

In contrast, if the controller 13 determines that the first position detection sensor 12A is located in an irregular section (YES in step S12), it determines the moving distance in the irregular section, of the vehicle 1 on the basis of the detection signal from the second position detection sensor 12B (step S13). The controller 13 then determines the current position of the vehicle 1 from the moving distance in the irregular section, of the vehicle 1 (step S14). The controller then outputs a position command indicating the movement position of the vehicle 1 to the drive controller 14 on the basis of the current position of the vehicle 1 determined in step S14 (step S15).

Figure 11:
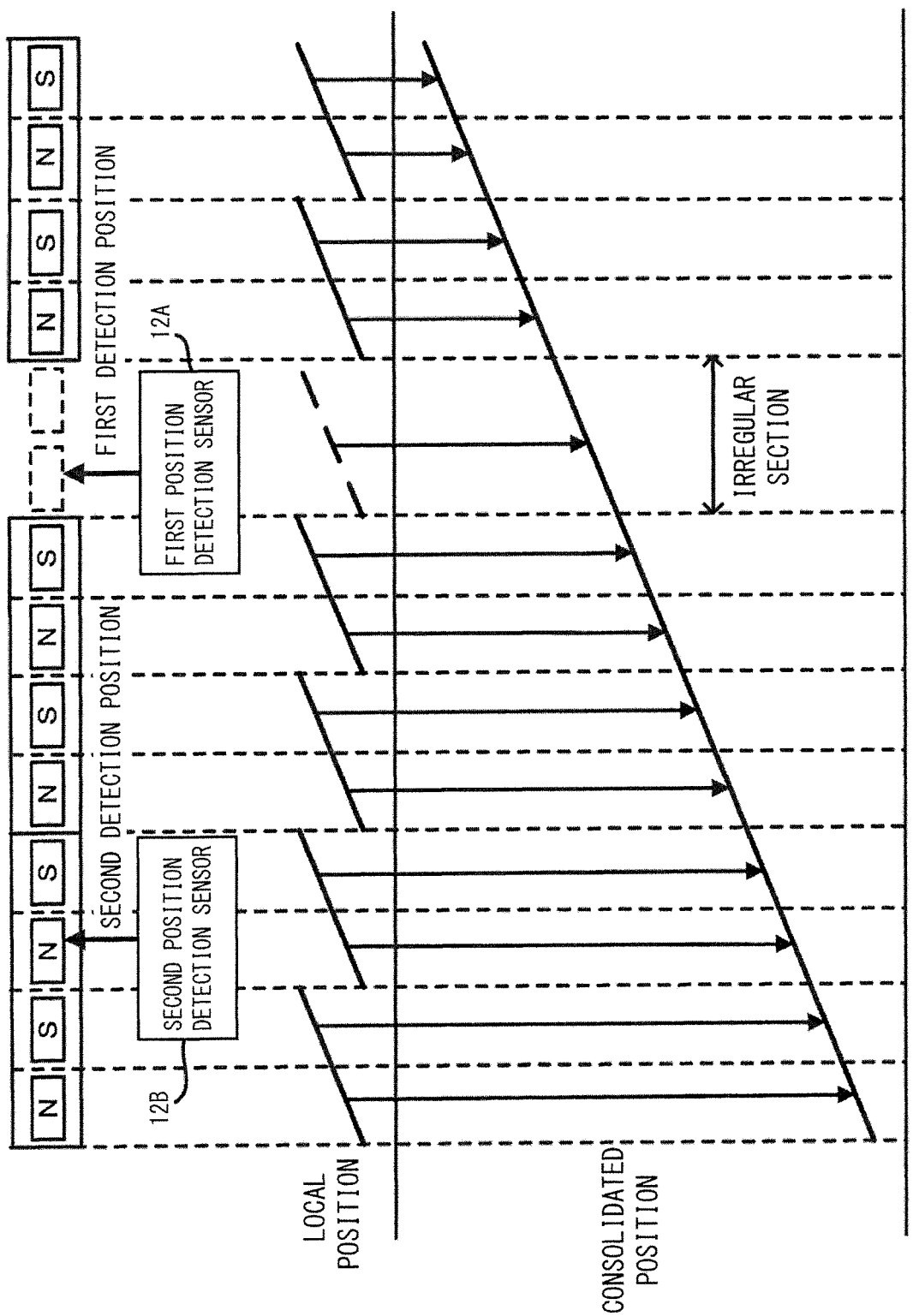
FIG. 11 is a diagram showing supplementary position detection control using a second position detection sensor performed when a first position detection sensor is located in an irregular section.

FIG. 11 is a diagram showing supplementary position detection control using the second position detection sensor performed when the first position detection sensor is located in an irregular section. When the first position detection sensor 12A is not located in any irregular section (NO in step S12), the controller 13 determines the current position of the vehicle 1 on the basis of the detection signal from the first position detection sensor 12A (step S11). Specifically, the first position detection sensor 12A outputs, to the controller (in this case, the position controller 131), a detection signal which corresponds to a voltage value from the Hall device and which varies with the movement of the vehicle 1; for example, when the vehicle 1 is traveling at a constant speed, the first position detection sensor 12A outputs a detection signal which varies in the same cycle; and the controller 13 then determines the number of magnets 3 through which the vehicle 1 has passed, by counting (that is, incrementing) changes in the detection signal from the first position detection sensor 12A and thus determines the position of the vehicle 1.

In FIG. 11, the controller 13 determines a local position of the vehicle 1 by unit of one set of a magnet 31 with a north pole and a magnet 32 with a south pole and then sums up (consolidates) the local positions and thus determines the position of the vehicle 1.

Whether the first position detection sensor 12A is located in an irregular section is determined as follows. That is, the controller 13 compares the changes in the detection signal of the first position detection sensor 12A and the changes in the detection signal of the second position detection sensor 12B; if there is disagreement in changes between these detection signals, the controller 13 determines that one of the detection sensors 12A and 12B is located in an irregular section; and the controller 13 then determines which of the detection sensors 12A and 12B is located in the irregular section, from the traveling direction of the vehicle 1.

When the first position detection sensor 12A is located in the irregular section as shown in FIG. 11 (YES in step S12), the controller 13 changes the position detection sensor used to determine the position of the vehicle 1 from the first position detection sensor 12A to the second position detection sensor 12B. At this time, the first position detection sensor 12A is located in the irregular section, whereas the second position detection sensor 12B is not located in the irregular section. Thus, the moving distance of the vehicle 1 can be determined using the second position detection sensor 12B.

As described above, the controller 13 determines the moving distance in the irregular section, of the vehicle 1 on the basis of the detection signal from the second position detection sensor 12B (step S13) and determines the current position of the vehicle 1 from the moving distance in the irregular section, of the vehicle 1 (step S14). Specifically, the controller 13 determines the number of magnets 3 through which the vehicle 1 has passed, by counting (that is, incrementing) changes in the detection signal from the second position detection sensor 12B and thus determines the moving distance of the vehicle 1; and the controller 13 then determines the position of the vehicle 1 by adding the moving distance of the vehicle 1 to the consolidated position of the vehicle 1. Note that if the detection signal of the second position detection sensor 12B is used, the position of the vehicle 1 may be determined based on the distance between the first position detection sensor 12A and second position detection sensor 12B. Specifically, the controller 13 determines the consolidated position of the vehicle 1 on the basis of not only the detection signal from the first position detection sensor 12A but also the detection signal from the second position detection sensor 12B; when the first position detection sensor 12A is located in any irregular section, the control unit 13 adds the distance between the first position detection sensor 12A and second position detection sensor 12B to the consolidated position of the vehicle 1 calculated based on the detection signal from the second position detection sensor 12B; and thus the consolidated position of the vehicle 1 based on the detection signal of the first position detection sensor 12A is determined.

Figure 12A:
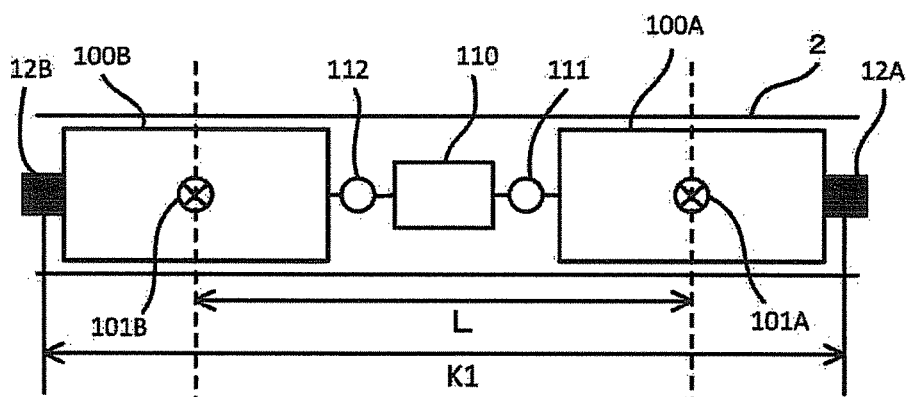
FIG. 12(A) shows the positions of the bogie trucks when the rail is linear.
Figure 12B:
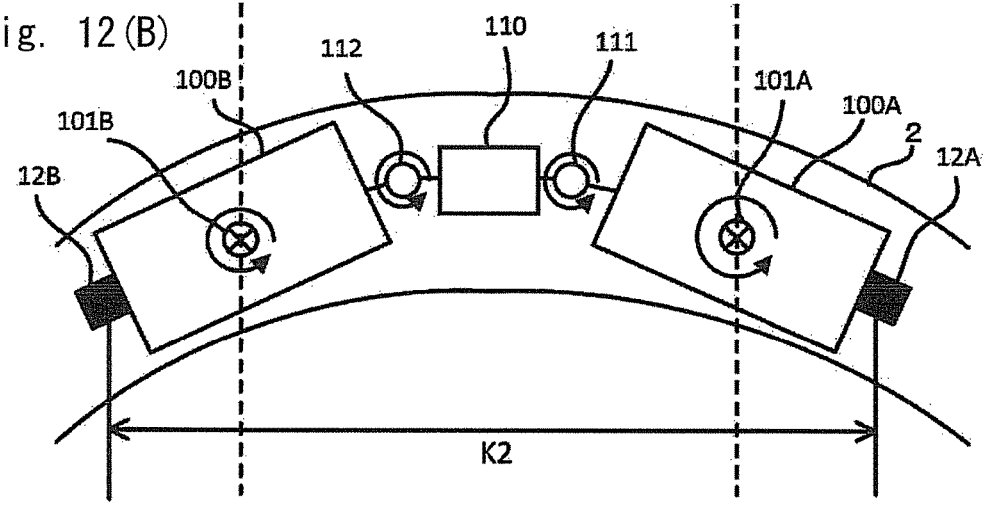
FIG. 12(B) shows the positions of the bogie trucks when the rail is curved.

FIG. 12 includes schematic diagrams showing bogie trucks, in which FIG. 12(A) shows the positions of the bogie trucks when the rail is linear; and FIG. 12(B) shows the positions of the bogie trucks when the rail is curved. The contact part of a vehicle 1 with a rail 2 comprises bogie trucks each including a mechanism rotatable with respect to the body (not shown) of the vehicle 1. Note that FIG. 12 shows cases where the rail 2 installed on the ceiling is seen from below.

As shown in FIG. 12, the vehicle 1 includes two bogie trucks, 100A and 100B. The bogie truck 100A is rotatably coupled to the body of the vehicle 1 using a center pin 101A.

The bogie truck 100B is rotatably coupled to the body of the vehicle 1 using a center pin 101B.

An intermediate part 110 is disposed between the bogie truck 100A and bogie truck 100B. The bogie truck 100A and intermediate part 110 are coupled together using a coupler 111, and the bogie truck 100B and intermediate part 110 are coupled together using a coupler 112. The couplers 111 and 112 are also formed rotatably. As shown in FIG. 12, a first position detection sensor 12A is mounted on a surface remote from the intermediate part 110 of the bogie truck 100A. A second position detection sensor 12B is mounted on a surface remote from the intermediate part 110 of the bogie truck 100B.

As shown in FIG. 12, the distance L between the center pin 101A of the bogie truck 100A and the center pin 101B of the bogie truck 100B does not vary between the case where the rail is linear [FIG. 12(A)] and the case where the rail 2 is curved [FIG. 12(B)]. On the other hand, the distance between the bogie truck 100A and intermediate part 110 or the distance between the bogie truck 100B and intermediate part 110 varies between the case where the rail 2 is linear [FIG. 12(A)] and the case where the rail 2 is curved [FIG. 12(B)]. Accordingly, as shown in FIG. 12, the distance between the position detection sensors 12A and 12B varies between the case where the rail 2 is linear [FIG. 12(A)] and the case where the rail 2 is curved [FIG. 12(B)]. That is, the distance between the position detection sensors 12A and 12B is K1 in the case where the rail 2 is linear [FIG. 12(A)], whereas the distance between the position detection sensors 12A and 12B is K2 in the case where the rail 2 is curved [FIG. 12(B)].

When the distance between the position detection sensors 12A and 12B varies according to whether the rail 2 is linear or curved as described above, difficulty seems to occur in supplementary position detection control using the second position detection sensor 12B performed when the first position detection sensor 12A is located in an irregular section. In the present embodiment, however, the controller 13 determines the positions of magnets 3 by incrementing the detection signal from the first position detection sensor 12A and then determines the position of the vehicle 1 from the positions of the magnets 3. Thus, even when the distance between the position detection sensors 12A and 12B varies, the consolidated position of the vehicle 1 is not displaced from the original position unless the controller 13 makes a mistake in the number of magnets 3 incremented based on the detection signal from the first position detection sensor 12A.

As described above, in the present embodiment, the vehicle 1 includes the two motors, 10A and 10B, disposed in different positions in the moving direction; and when one of the two motors is located in an irregular section in which the poles of magnets 3 are not disposed regularly, the motor other than the one motor is located in a section which is not the irregular section. Thus, even when the one motor is located in the irregular section, the vehicle 1 can be moved by driving the other motor. As a result, the presence of an irregular section is allowed, and the length of the movement path is not limited to the pitch of a magnet.

Irregular sections include a section in which no magnet 3 is disposed. Accordingly, the vehicle 1 can be driven normally even in a section in which no magnet 3 is disposed on the rail 2. Irregular sections also include a section in which magnets with south poles and magnets with north poles are not alternately disposed. Accordingly, the vehicle 1 can be driven normally even in a section in which magnets 3 are not regularly alternately disposed on the rail 2. Further, the vehicle 1 includes the drive controller 14, which stops the drive of the motor 10A or 10B located in an irregular section. Thus, it is possible to prevent the motor 10A or 10B and the poles of magnets 3 from losing synchronization in an irregular section, as well as to synchronize the motor 10A or 10B and the poles of magnets 3 after the irregular section ends.

Further, the vehicle 1 includes the detectors 11A and 11B, which detect an irregular section, and the drive controller 14 stops the drive of the motor 10A or 10B on the basis of the detection of an irregular section by the detector 11A or 11B. Thus, it is possible to reliably detect that the motor 10A or 10B is located in an irregular section. As a result, it is possible to reliably stop the drive of the motor 10A or 10B in the irregular section. Further, the detectors 11A and 11B are provided with each of the multiple motors. Thus, it is possible to reliably detect that each of the multiple motors, 10A and 10B, is located in an irregular section.

Further, the detectors 11A and 11B are optical sensors which detect magnets 3 and therefore can accurately detect an irregular section using the emission and reception of light. Further, the drive controller 14 includes the bootstrap circuit 50, and the bootstrap capacitor 60 of the bootstrap circuit 50 is charged with a charge time corresponding to the time period during which the motor 10A or 10B has been stopped. Thus, it is possible to reliably start to drive the motor 10A or 10B within the shortest time.

In the present embodiment, when the first position detection sensor 12A is located in an irregular section in which the poles of magnets 3 are not disposed regularly, the controller 13 determines the position of the vehicle 1 on the basis of a position detected by the second position detection sensor 12B. Thus, even when an irregular section in which the position cannot be detected is present on the movement path 2, it is possible to determine the accurate position of the vehicle 1.

Further the second position detection sensor 12B detects the position of the vehicle 1 by detecting the poles of magnets 3. Thus, it is possible to reliably determine the position of the vehicle 1 on a magnet 3 basis. Further, the controller 13 compares the position detected by the first position detection sensor 12A and the position detected by the second position detection sensor 12B and thus determines that one of the first position detection sensor 12A and second position detection sensor 12B is located in an irregular section. Thus, it is possible to reliably determine that one of the first position detection sensor 12A and second position detection sensor 12B is located in an irregular section. Further, irregular sections include a section in which no magnet 3 is disposed. Thus, it is possible to reliably determine the position of the vehicle 1 even in a section in which no magnet 3 is disposed. Further, irregular sections include a section in which magnets 31 with south poles and magnets 32 with north poles are not alternately disposed. Thus, it is possible to reliably determine the position of the vehicle 1 even in a section in which magnets 31 with south poles and magnets 32 with north poles are not alternately disposed.

While the embodiment has been described above, the present invention is not limited to the elements or the like shown in the drawings. The functions, purposes, or the like of the elements can be changed without departing from the spirit and scope of the invention.

While the detectors 11A and 11B (first magnet absence detection sensor 11A, second magnet absence detection sensor 11B) include photosensors in the above embodiment, these detectors may include magnetic pole detection sensors using Hall devices in place of photosensors. In this case, the Hall device of each magnetic pole detection sensor detects an irregular section by detecting the distortion (disturbance) of the magnetic field in the irregular section. The detectors 11A and 11B thus configured can more reliably detect an irregular section on the basis of the distortion of the magnetic field. The detectors 11A and 11B may also be contact-type measuring instruments (e.g., measuring instruments using probes).

While the position detectors 12A and 12B (first position detection sensor 12A, second position detection sensor 12B) include magnetic pole detection sensors for detecting the magnetic pole in the above embodiment, these detectors may be composed of photosensors in place of magnetic pole detection sensors. While the controller 13 determines the positions of magnets 3 by incrementing the detection signal from the position detector 12A or 12B and then determines the position of the vehicle 1, other configurations may be employed. For example, the position detector 12A or 12B may detect the absolute value of the moving distance of the vehicle 1, and the controller 13 may determine the position of the vehicle 1 on the basis of the absolute value of the moving distance of the vehicle 1 detected by the position detector 12A or 12B. Further, the absolute value (absolute position) of the moving distance of the vehicle 1 may be detected using an encoder or the like.

In the above embodiment, the first magnet absence detection sensor 11A and second magnet absence detection sensor 11B detect the presence or absence of a magnet 3 in an irregular section, and the first position detection sensor 12A and second position detection sensor 12B detect the position of the vehicle 1. Alternatively, the detector may include one set of detection sensors (sensors), and the one set of sensors may detect both the presence or absence of a magnet 3 in an irregular section (the detection of an irregular section) and the position of the vehicle 1. That is, the magnet absence detection sensors 11A and 11B and position detection sensors 12A and 12B may be common detectors, respectively. In this case, the controller 13 determines that the first motor 10A is located in an irregular section, on the basis of a detection signal from a first detector and determines the position of the vehicle 1 on the basis of a signal from a second detector. Alternatively, the controller 13 determines that the second motor 10B is located in an irregular section, on the basis of a detection signal from the second detector and determines the position of the vehicle 1 on the basis of a detection signal from the first detector. According to these configurations, the number of detectors is reduced and thus the cost is reduced. Further, the process can be simplified.

In the above embodiment, when the first position detection sensor 12A is located in an irregular section, the position of the vehicle 1 is determined using the second position detection sensor 12B. Specifically, the controller 13 determines the position of the vehicle 1 on the basis of the detection signal of the first position detection sensor 12A and, only when the first position detection sensor 12A is located in an irregular section, determines the position of the vehicle 1 on the basis of the detection signal of the second position detection sensor 12B in a supplementary manner. Alternatively, the controller 13 may determine respective local positions and consolidated positions on the basis of the detection signals of the two position detection sensors, 12A and 12B; and when one of the two position detection sensors, 12A and 12B, is located in an irregular section, the control unit 13 may, in a supplementary manner, determine the other consolidated position on the basis of the detection signal of the position detection sensor which is not located in the irregular section. In this case, the position of the vehicle 1 can be determined more reliably. Further, the position of the first motor 10A may be determined by detecting the position using the first position detection sensor 12A corresponding to the first motor 10A, and the position of the second motor 10B may be determined by detecting the position using the second position detection sensor 12B corresponding to the second motor 10B.

While the two motors are provided with the vehicle 1 in the above embodiment, three or more motors may be provided. Even in this case, when one of the multiple motors is located in an irregular section, the motors other than the one motor are not located in the irregular section. In this case also, a magnet absence detection sensor and a position detection sensor are preferably provided for each of the motors.

While the two magnet absence detection sensors, 11A and 11B, are provided so as to correspond to the two motors, 10A and 10B, only a single magnet absence detection sensor may be provided. In this case, the controller 13 determines the timing when the first motor 10A is located in an irregular section, for example, on the basis of the timing when the magnet absence detection sensor detects the irregular section and the distance between the magnet absence detection sensor and the first motor 10A. Similarly, the controller 13 determines the timing when the second motor 10B is located in an irregular section, on the basis of the timing when the magnet absence detection sensor detects the irregular section and the distance between the magnet absence detection sensor and the second motor 10B.

While it is assumed in the above embodiment that the pitch between the motors 10A and 10B in the moving direction is five times larger than the pitch of a magnet 3 (33 mm), the motor-to-motor pitch is not limited to such a pitch. Further, the moving body system is not limited to systems using a ceiling traveling vehicle and may be any systems in which a vehicle moves along a rail 2 installed on the ground.

While the two position detection sensors, 12A and 12B, are mounted on the vehicle 1 (bogie trucks 100A and 100B) in the example shown in FIG. 12, the position detection sensors may be mounted on positions other than such positions. Further, another position detection sensor may be mounted on the intermediate part 110. By using the detection sensor mounted on the intermediate part 110, the precise position of the vehicle 1 (the central position of the vehicle 1) can be detected, since the intermediate part 110 is located midway between the bogie trucks 100A and 100B.

In the above embodiment, the vehicle 1 moves by the thrust generated by the two motors, 10A and 10B. Assuming that the thrust generated by the two motors, 10A and 10B, is 100%, the thrust generated by each motor (first motor 10A, second motor 10B) is 50%. When one of the two motors is located in an irregular section, the thrust of the vehicle 1 is reduced to 50% due to the stop of that motor. Even in this case, the drive control of the vehicle 1 is not significantly affected, since the time period during which the one of the two motors is located in the irregular section is short. Alternatively, when one of the two motors is located in an irregular section and thus the motor is stopped, drive control may be performed so that the thrust of the other motor is increased. For example, when one motor is located in an irregular section and thus the drive of the motor is stopped, control may be performed so that the thrust of the other motor is increased to 100% (doubled) or a thrust close to 100%. According to this configuration, even when one of the two motors is located in an irregular section, the vehicle 1 can travel without reducing the thrust.

DESCRIPTION OF REFERENCE SIGNS 1 vehicle (moving body)
2 rail (movement path)
3 magnet
10A first motor (motor)
10B second motor (motor)
11A first magnet absence detection sensor (detector)
11B second magnet absence detection sensor (detector)
12A first position detection sensor (first position detector)
12B second position detection sensor (second position detector)
13 controller
14 drive controller
31 magnet with north pole
32 magnet with south pole
50 bootstrap circuit
60 bootstrap capacitor

The invention claimed is:

1. A moving body system comprising:
a rail, wherein the rail comprises a regular section in which magnets with south poles and magnets with north poles are alternately disposed, and an irregular section in which magnets are not disposed, or the magnets with south poles and magnets with north poles are not alternately disposed; and
a moving body configured to move along the rail, wherein the moving body comprises a plurality of motors disposed in different positions in a moving direction thereof,
wherein one of the plurality of motors is located in the irregular section,
wherein at least one of the plurality of motors other than the one motor is located in a section which is not the irregular section,
wherein the moving body comprises a drive controller configured to stop drive of a motor positioned in the irregular section,
wherein the moving body comprises a detector configured to detect the irregular section, the drive controller stops the drive of the motor on a basis of detection of the irregular section by the detector,
wherein the detector detects the irregular section, as well as a regular section in which the poles of magnets are disposed regularly, and when the detector detects the irregular section and then detects the regular section, the drive controller restarts the stopped drive of the motor,
wherein the detector detects the irregular section, as well as the regular section in which the poles of magnets are disposed regularly, by detecting the magnets, and when the detector detects the irregular section and then continuously detects a plurality of magnets starting from a first magnet in the regular section, the drive controller restarts the stopped drive of the motor.

2. The moving body system of claim 1, wherein the irregular section is a section in which the magnets are not disposed.

3. The moving body system of claim 1, wherein the irregular section is a section in which the magnets with south poles and magnets with north poles are not alternately disposed.

4. The moving body system of claim 1, wherein the irregular section is shorter than a distance between motors disposed at both ends in the moving direction of the motors.

5. The moving body system of claim 1, wherein the detector is provided for each of the motors.

6. The moving body system of claim 1, wherein the detector is an optical sensor configured to detect the magnets.

7. The moving body system of claim 1, wherein
the detector comprises one set of sensors, and
the one set of sensors detects the irregular section and a position of the moving body.

8. The moving body system of claim 1, wherein
the drive controller comprises a bootstrap circuit, and
a bootstrap capacitor of the bootstrap circuit is charged with a charge time corresponding to a time during which the motor has been stopped.

9. A method for driving a moving body, the moving body moving along a rail, wherein the rail comprises a regular section in which magnets with south poles and magnets with north poles are alternately disposed, and an irregular section in which magnets are not disposed, or the magnets with south poles and magnets with north poles are not alternately disposed, the method comprising:
when one of a plurality of motors disposed in different positions in a moving direction of the moving body is located in the irregular section, stopping drive of the one motor,
wherein the moving body comprises a drive controller configured to stop drive of a motor positioned in the irregular section,
wherein the moving body comprises a detector configured to detect the irregular section, the drive controller stops the drive of the motor on a basis of detection of the irregular section by the detector,
wherein the detector detects the irregular section, as well as a regular section in which the poles of magnets are disposed regularly, and when the detector detects the irregular section and then detects the regular section, the drive controller restarts the stopped drive of the motor,
wherein the detector detects the irregular section, as well as the regular section in which the poles of magnets are disposed regularly, by detecting the magnets, and when the detector detects the irregular section and then continuously detects a plurality of magnets starting from a first magnet in the regular section, the drive controller restarts the stopped drive of the motor.

10. The moving body system of claim 7, wherein
the one set of sensors detects the presence or absence of a magnet in the irregular section and the position of the moving body.

11. The moving body system of claim 8, wherein
the charge time corresponding to a time during which the motor has been stopped is the time it takes for the bootstrap capacitor to discharge.

* * * * *